United States Patent
Chen et al.

(10) Patent No.: US 8,780,071 B2
(45) Date of Patent: Jul. 15, 2014

(54) CAPACITIVE TOUCH PANEL WITH MULTIPLE ZONES

(75) Inventors: Cheng-An Chen, Hsinchu (TW); Tun-Chun Yang, Hsinchu (TW); Seok-Lyul Lee, Hsinchu (TW); Wei-Ming Huang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 309 days.

(21) Appl. No.: 12/658,364

(22) Filed: Feb. 10, 2010

(65) Prior Publication Data

US 2011/0192657 A1     Aug. 11, 2011

(51) Int. Cl.
*G06F 3/044* (2006.01)

(52) U.S. Cl.
USPC ........................................ 345/174; 178/18.06

(58) Field of Classification Search
USPC ......... 178/18.01–18.09, 18.11; 345/173–178, 345/104
See application file for complete search history.

(56) References Cited

U.S. PATENT DOCUMENTS

| 5,869,791 | A | 2/1999 | Young | 178/20.01 |
| 6,057,903 | A | 5/2000 | Colgan et al. | 349/139 |
| 2005/0179672 | A1 | 8/2005 | Chiu et al. | 345/173 |
| 2007/0008299 | A1 | 1/2007 | Hristov | 345/173 |
| 2007/0062739 | A1 | 3/2007 | Philipp et al. | 178/18.06 |
| 2008/0007534 | A1 | 1/2008 | Peng et al. | 345/173 |
| 2008/0079699 | A1 | 4/2008 | Mackey | 345/174 |
| 2009/0322702 | A1* | 12/2009 | Chien et al. | 345/174 |
| 2010/0289774 | A1* | 11/2010 | Pan et al. | 345/175 |

FOREIGN PATENT DOCUMENTS

| CN | 101122839 | 2/2008 |
| CN | 101408825 | 4/2009 |
| EP | 2120341 A2 | 11/2009 |
| JP | 06035608 | 8/1994 |
| WO | WO 0235460 A1 * | 5/2002 |
| WO | 2007089485 | 8/2007 |

OTHER PUBLICATIONS

European Search Report dated May 24, 2011 in the European Case No. 10165446.5-2224 which is the EP Counterpart of U.S. Appl. No. 12/658,364.
TW Office Action dated Sep. 17, 2013 (12 pages).

* cited by examiner

*Primary Examiner* — Stephen Sherman

(57) ABSTRACT

In a capacitive touch panel having touch cells arranged in a two-dimensional array and defined by two coordinates, the present invention provides a third coordinate. In particular, the touch cells in a row are electrically connected a first sensing element and the touch cells in a column are electrically connected in a second sensing element. The first sensing elements can be arranged into two or more touch zones. Each of the touch zones has a zone sensing element for defining the zone coordinate. Some of the first sensing elements in one touch zone are electrically connected to the corresponding first sensing elements in the other touch zones in series. As such, the number of terminals connected to the first sensing elements can be reduced.

19 Claims, 15 Drawing Sheets

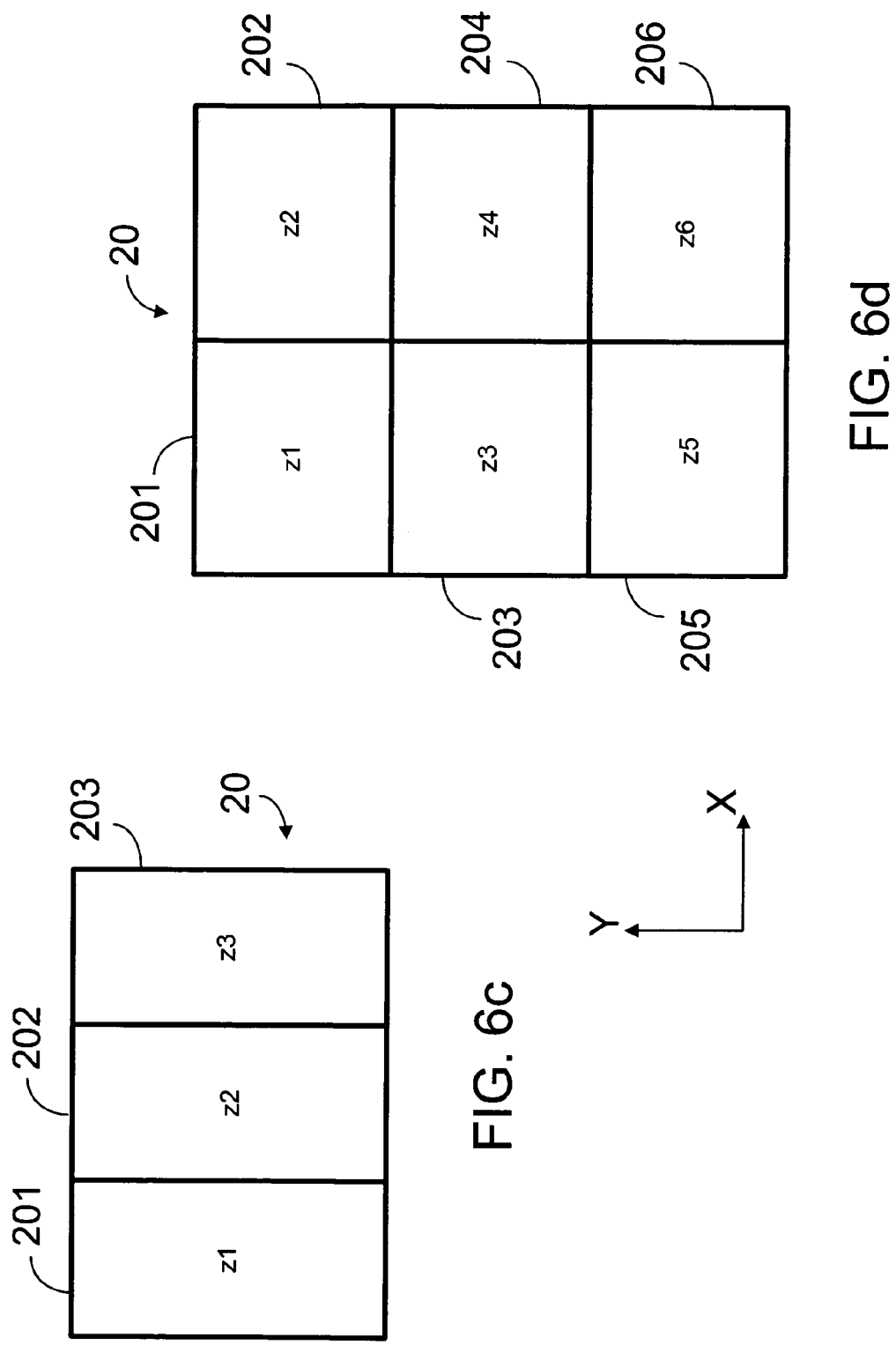

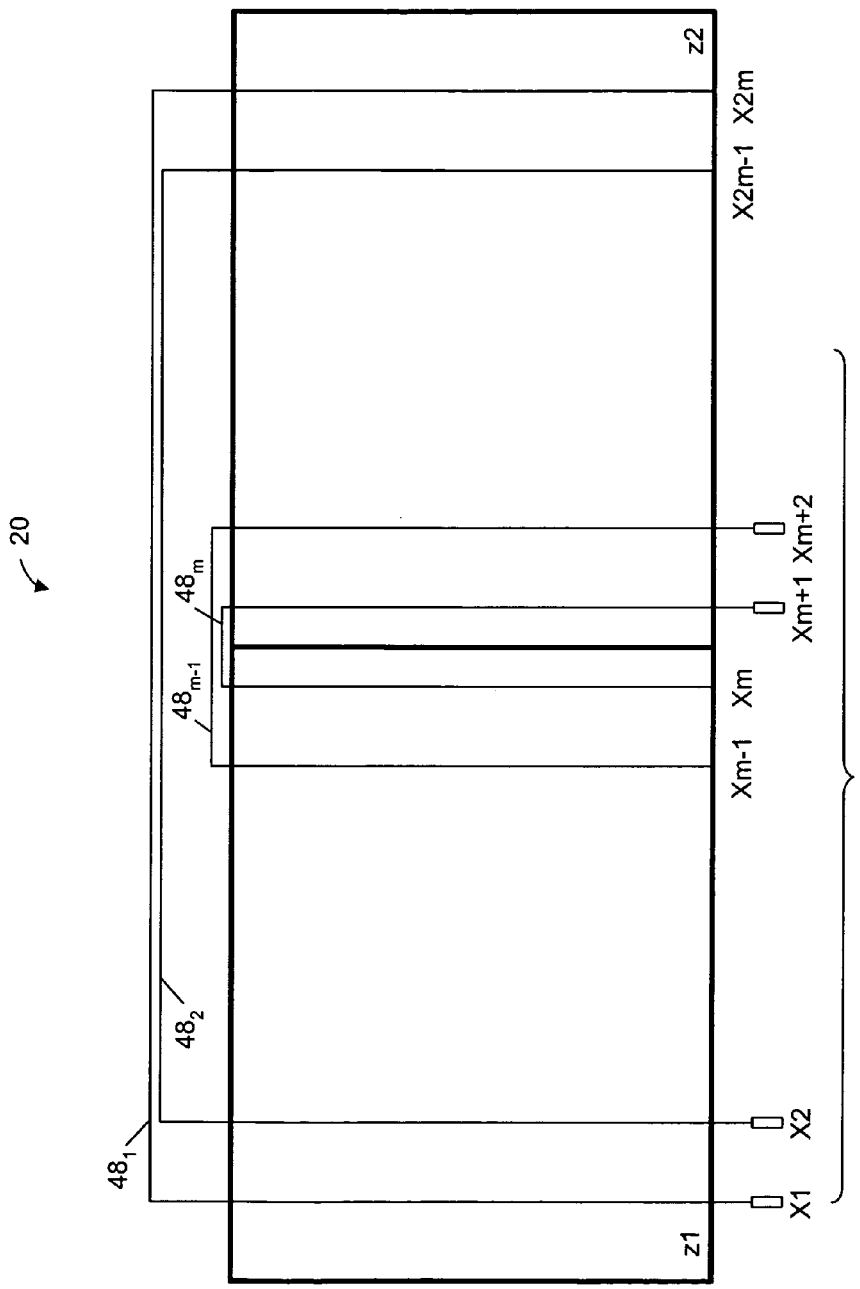

CAPACITIVE TOUCH PANEL WITH MULTIPLE ZONES

FIELD OF THE INVENTION

The present invention relates generally to a touch panel and, more particularly, to a touch panel having a plurality of touch zones arranged in a two-dimensional array.

BACKGROUND OF THE INVENTION

A touch panel is commonly used for providing the coordinates of a touch point on the panel. In particular, the coordinates are usually computed from the voltage or current readout when the panel is touched as compared to the voltage or current readout when the panel is not touched. Such a touch panel allows a user to select a menu item, to read a gesture, to write a letter or to draw a symbol, for example. A touch panel can be a stand-alone panel or integrated with a display panel, such as a liquid-crystal display (LCD) panel.

SUMMARY OF THE INVENTION

In a capacitive touch panel having touch cells arranged in a two-dimensional array and defined by two coordinates, the present invention provides a third coordinate. In particular, the touch cells in a row are electrically connected a first sensing element and the touch cells in a column are electrically connected in a second sensing element. The first sensing elements can be arranged into two or more touch zones. Each of the touch zones has a zone sensing element for defining the zone coordinate. Some of the first sensing elements in one touch zone are electrically connected to the corresponding first sensing elements in the other touch zones in series. As such, the number of terminals connected to the first sensing elements can be reduced.

Thus, the first aspect of the present invention is a capacitive touch panel, which comprises:
  a substrate comprising a plurality of touch zones; and
  a touch sensing unit disposed on the substrate, the touch sensing unit comprising:
    a plurality of first sensing elements disposed in the touch zones, each first sensing element arranged in a first direction for defining a first coordinate;
    a plurality of second sensing elements disposed in the touch zones, each second sensing element arranged in a second direction for defining a second coordinate; and
    a plurality of zone sensing elements, each zone sensing element disposed in a corresponding one of touch zones for defining a zone coordinate.

In some embodiment of the present invention, the touch panel further comprises a plurality of first edge-bridge lines, wherein at least some of the first sensing elements in one of the touch zones are separately connected to corresponding ones of the first sensing elements in at least another of the touch zones in series via the first edge-bridge lines. The first edge-bridge lines can be arranged in parallel or in a crossed manner.

In some embodiments of the present invention, the plurality of touch zones comprise a first touch zone and a second touch zone, and the plurality of first sensing elements comprise a first group of first sensing elements located in the first touch zone and a second group of first sensing elements located in the second touch zone, and the touch panel further comprises:
  a plurality of first edge-bridge lines for separately connecting at least some of the first sensing elements in the first group to the corresponding first sensing elements in the second group in series.

In other embodiments of the present invention, the plurality of touch zones comprise a first touch zone, a second touch zone, a third touch zone and a fourth touch zone arranged in a two dimensional array, and wherein
  the plurality of first sensing elements comprise a first group of first sensing elements and a second group of first sensing elements, the first group of first sensing elements located in the first touch zone and the third touch zone, the second group of first sensing elements located in the second touch zone and the fourth touch zone, and
  the plurality of second sensing elements comprise a first group of second sensing elements and a second group of second elements, the first group of second sensing elements located in the first touch zone and the second touch zone, the second group of second sensing elements located in the third touch zone and the fourth touch zone, said touch panel further comprising:
  a plurality of first edge-bridge lines for separately connecting at least some of first sensing elements in the first group of the first sensing elements to the corresponding first sensing elements in the second group of the first sensing elements in series; and
  a plurality of second edge-bridge lines for separately connecting at least some of second sensing elements in the first group of the second sensing elements to the corresponding second sensing elements in the second group of the second sensing elements in series.

In order to monitor a touch event, the touch panel further comprises:
  a plurality of first terminals electrically connected to at least some of the first sensing elements; a plurality of second terminals electrically connected to at least some of the second sensing elements; a plurality of third terminals electrically connected to the zone sensing elements; and a driving integrated circuit electrically connected to the first terminals, the second terminals and the third terminals for driving the first sensing elements, the second sensing elements and the third sensing elements.

In one embodiment of the present invention, the substrate has a first side and an opposing second side, and wherein the first sensing elements and the second sensing elements are disposed on the first side, and the zone sensing elements are disposed either on the first side or on the second side. The substrate may comprise a display panel. The substrate may comprise a rigid printed circuit board or a flexible printed circuit board. The substrate can be transparent.

In some embodiments of the present invention, each of the first sensing elements comprises a plurality of first sensing pads connected in series and each of the second sensing elements comprises a plurality of second sensing pads connected in series. One or more sensing pads are generally arranged near or on a crossing point of a first sensing element and a second sensing element to form a touch cell.

The second aspect of the present invention provides a method for use in a capacitive touch panel, the touch panel comprising:
  a substrate;
  a touch sensing unit disposed on the substrate, the touch sensing unit comprising:
    a plurality of first sensing elements, each first sensing element arranged in a first direction for defining a first coordinate;

a plurality of second sensing elements, each second sensing element arranged in a second direction for defining a second coordinate, said method comprising:

arranging the substrate into a first touch zone and a second touch zone;

arranging the plurality of first sensing elements into a first group of first sensing elements and a second group of first sensing elements, the first group located in the first touch zone and the second ground located in the second touch zone;

electrically connecting at least some of the first sensing elements in the first group to corresponding ones of the first sensing elements in the second group in series; and providing a first zone sensing element in the first touch zone for defining a first zone coordinate and a second zone sensing element in the second touch zone for defining a second zone coordinate.

The method further comprises:

electrically connecting said some of the first sensing elements to a plurality of first sensing terminals;

electrically connecting at least some of the second sensing elements to a plurality of second sensing terminals;

electrically connecting the first zone sensing element and the second zone sensing element to a first zone terminal and the second zone terminal; and providing a driving circuit for driving the first sensing terminals, the second sensing terminals, the first zone terminal and the second zone terminal.

In some embodiments of the present invention, the method further comprises:

arranging the plurality of the second sensing elements into a first group of second sensing element and a second group of sensing elements;

arranging the first touch zone into a third zone and a fourth zone, and arranging the second touch zone into a fifth zone and a sixth zone, such that the first group of the first sensing elements are located in the third and fourth zones, the second group of the first sensing elements are located in the fifth and sixth zones, the first group of the second sensing elements are located in the third and fifth zones, and the second group of the second sensing elements are located in the fourth and sixth zones;

electrically connecting at least some of the second sensing elements in the first group of the second sensing elements to corresponding ones of the second sensing elements in the second group of the second sensing elements in series, wherein the first zone element comprises a third zone element and a fourth zone element, the third zone element locate in the third zone for defining a third zone coordinate and the fourth zone element located in the fourth zone for defining a fourth zone coordinate; and the second zone element comprises a fifth zone element and a sixth zone element, the fifth zone element locate in the fifth zone for defining a fifth zone coordinate and the sixth zone element located in the sixth zone for defining a sixth zone coordinate. The method further comprises:

electrically connecting said some of the first sensing elements to a plurality of first sensing terminals;

electrically connecting at least some of the second sensing elements to a plurality of second sensing terminals;

electrically connecting the first zone sensing element to a first zone terminal, the second zone sensing element to a second zone terminal, the third zone sensing element to a third zone terminal, and the fourth zone sensing element to a fourth zone terminal; and providing a driving circuit for driving the first sensing terminals, the second sensing terminals, the first zone terminal, the second zone terminal, the third zone terminal and the fourth zone terminals.

The present invention will become apparent upon reading the description taken in conjunction with FIGS. 1-11.

BRIEF DESCRIPTION OF THE DRAWINGS

FIGS. 6a-6d show different ways to partition a touch area, according to the present invention.

FIGS. 7a-7d show different ways in arranging the inter-zone connectors, according to various embodiments of the present invention.

DETAILED DESCRIPTION

Figure 1:
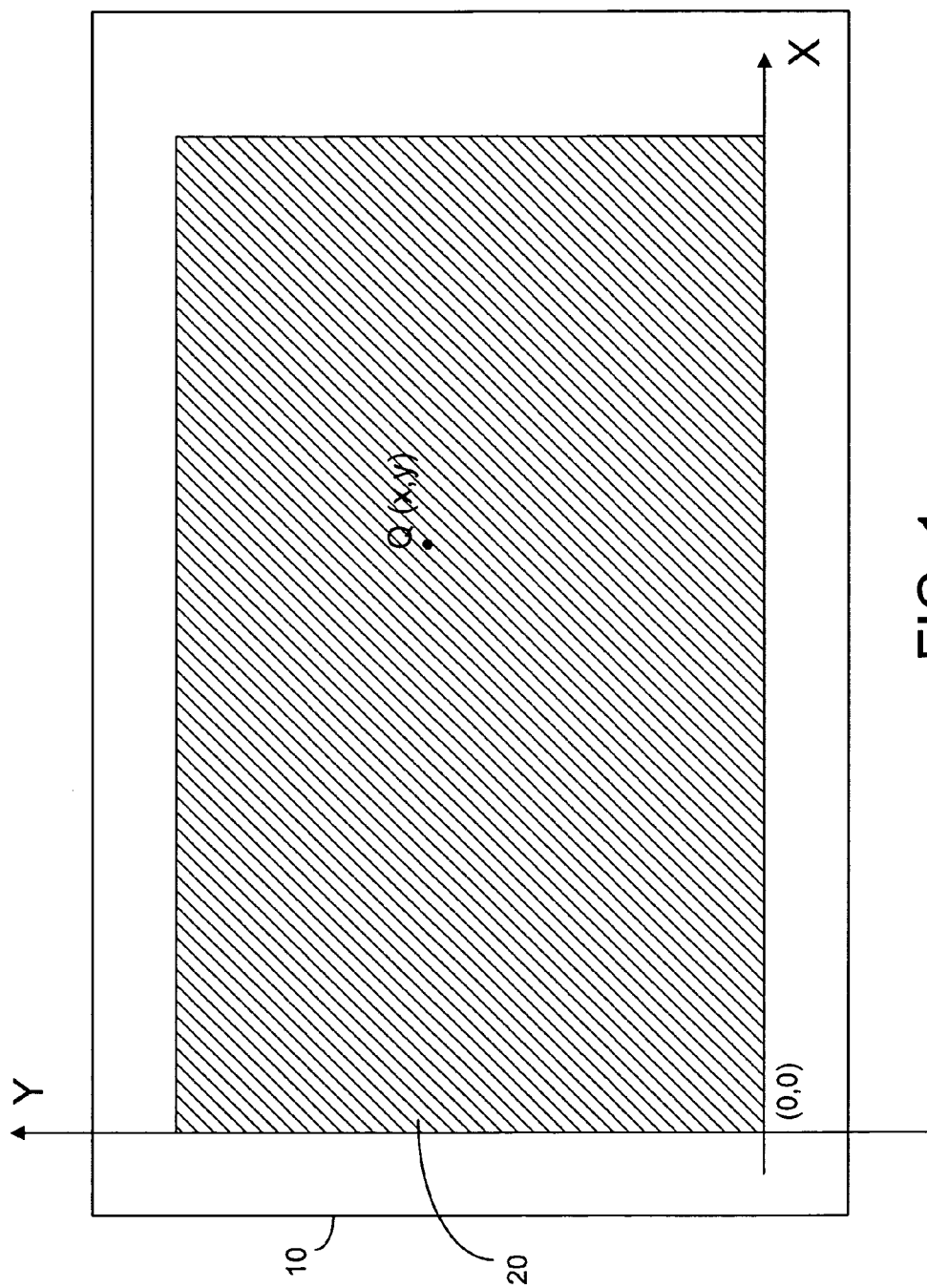
FIG. 1 is a schematic representation of a touch panel of the present invention.

A schematic touch panel of the present invention comprises a component panel or a substrate and a touch sensing unit as shown in FIG. 1. As shown in FIG. 1, the component panel 10 has a touch sensing unit 20 with capacitive touch areas for touch sensing. The touch sensing unit 20 can be rectangular in shape such that any touch point Q within the touch sensing unit 20 can be represented by the coordinates (x, y). It should be noted that one or more of the borders on the component panel 10 outside the touch sensing unit 20 may not be necessary and can be eliminated.

Figure 2:
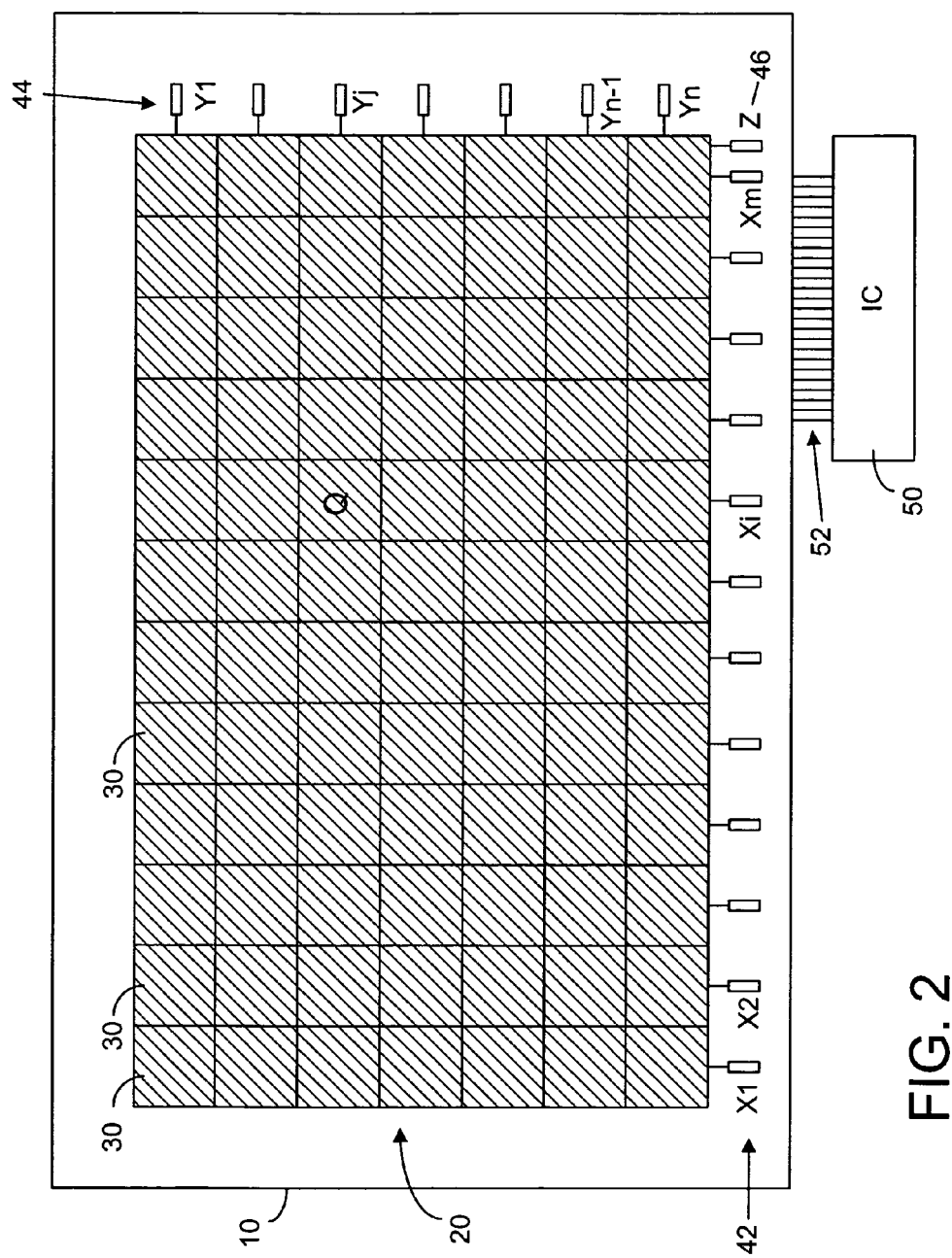
FIG. 2 shows a schematic representation of a touch panel of the present invention.

On the component panel 10, the touch sensing unit 20 comprises a plurality of touch cells 30, each of which has a unique pair of coordinates in x and y. As illustrated in FIG. 2, all the touch cells 30 having the same y coordinate are electrically connected to one of the readout terminals 44 including Y1, . . . , Yn, and all the touch cells 30 having the same x coordinate are electrically connected to one of the readout terminals 42 including X1, . . . , Xm. The terminals X1, . . . , Xm, Y1, . . . , Yn are connected to an integrated circuit (IC) 50 through a connector 52 for touch monitoring purposes. The IC 50 has a large number of channels (not shown), each of which is connected to a readout terminal. When a touch event occurs, the capacitance in the electrical conductors connecting to the touch cell being touched in the x coordinate and in the y coordinate will be caused to change. The changes in the capacitance can be sensed by the IC 50. For example, if the touch cell Q is touched, the IC 50 is configured to sense the changes in the capacitance in the electrical conductors connected to the terminals Xi and Yj and the coordinates (xi, yj) of the touch cell Q can be identified. The present invention adds another coordinate Z, as denoted by reference numeral 46.

Under some conditions, the number of terminals can be connected to the IC for touch monitoring is limited. For example, if the standard ICs for touch monitoring have Nmax channels to be connected to Nmax readout terminals in total, two or more ICs must be used to monitor a touch event in the entire touch sensing unit when (m+n) exceeds Nmax.

The present invention aims at reducing the number of ICs when the total number of x coordinates and y coordinates of the touch cells exceeds a certain number by dividing the touch sensing unit 20 into two or more zones. By such a division, the total number of X terminals 42 and Y terminals 44 needed for connecting to the touch cells 30 can be reduced by a factor of two or more. For example, if the IC has only Nmax channels to be connected to the X terminals and Y terminals for touch event monitoring, and the total number of x coordinates and y coordinates, or Ctotal, is greater than Nmax but smaller than or equal to 2Nmax−4, then it is possible to arrange the touch sensing unit 20 into two touch zones with two zone sensing elements, z1 and z2. Each of the zone sensing elements is electrically connected to a zone terminal 46, as shown in FIG. 3.

Figure 3:
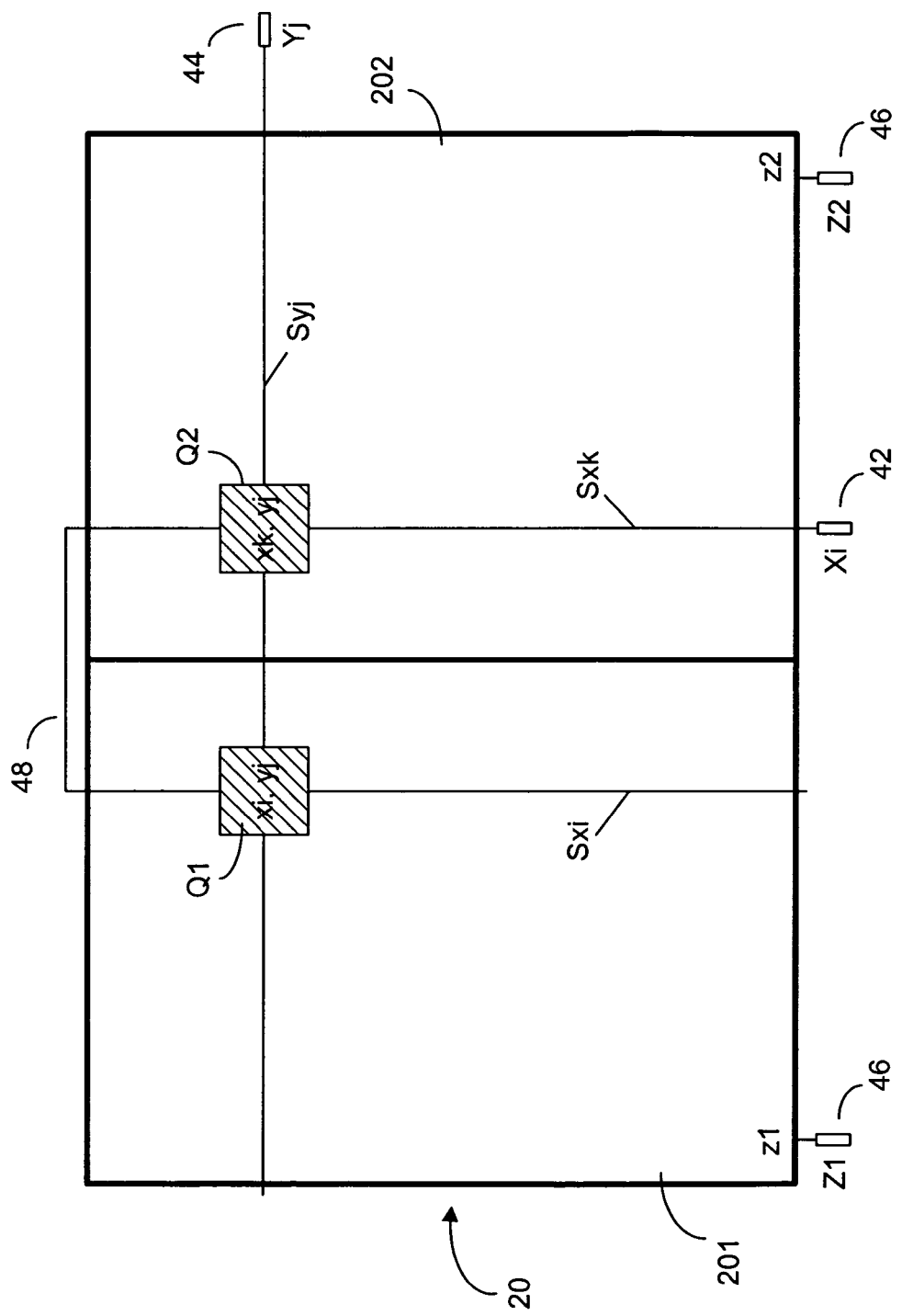
FIG. 3 shows a touch panel, according to one embodiment of the present invention.

As shown in FIG. 3, the coordinates of touch cell Q1 are (xi, yj) and the coordinates of touch cell Q2 are (xk, yj). Q1 is located inside zone sensing element z1 and Q2 is located inside zone sensing element z2. Zone sensing elements z1 and z2 are electrically connected to zone terminals Z1 and Z2 separately. The touch cells Q1, Q2 and other touch cells on the same row are electrically connected to terminal Yj via a sensing element Syj, so that the coordinate yj can be determined via the terminal Yj. The touch cell Q1 and other touch cells on the same column are electrically connected by a sensing element Sxk. The touch cell Q2 and other touch cells on the same column are electrically connected by a sensing element Sxj. In this embodiment, the sensing element Sxi and Sxk are electrically connected to terminal Xi via edge-bridge line 48. As such, the coordinates xi and xk can be determined via terminals X1, Z1 and/or Z2. Thus, the read-out terminal for sensing element Sxk is eliminated. The terminals 42, 44 and 46 are connected to an IC (see FIG. 2) for touch event monitoring. In effect, the coordinates of Q1 are (xi, yj, z1) and the coordinates of Q2 is (xi, yj, z2). If the touch cell Q1 is touched, the capacitance changes can be sensed by the IC through terminals Xi, Yj and Z1, but not Z2. If the touch cell Q2 is touched, the capacitance changes can be sensed by the IC through terminals Xi, Yj and Z2, but not Z1. Thus, it is possible to electrically connect only one of the zone sensing elements z1, z2 to a channel on the IC.

The touch cell 30 in a touch sensing unit can be designed and arranged differently. For example, the touch cells 30 can be rectangular in shape as shown in FIG. 4a. The touch cells 30 can be rectangular in shape but they are all tilted in 45 degrees, as shown in FIG. 4b. It should be noted that each of the touch cells 30 as shown in FIGS. 4a and 4b has a unique coordinate (x, y). As such, the touch cells 30 in row j are electrically connected by sensing element Syi in a y-direction and the touch cells 30 in column i are electrically connected by sensing element Sxi in x-direction. In the arrangement as shown in FIG. 4c, only the touch cells 30 in every other row are electrically connected by a sensing element Sy, and only the touch cells 30 in every other column are electrically connected by a sensing element Sx. Each sensing element Sy includes a plurality of y sensing pads connected in series, and each sensing element Sx includes a plurality of x sensing pads connected in series. A touch cell 30, in this arrangement, is substantially defined at a crossing point by a rectangular in dashed lines, and each touch cell 30 includes part of four sensing pads. A similar arrangement of the touch cells with an array of hexagons is shown in FIG. 4d.

Figure 5:
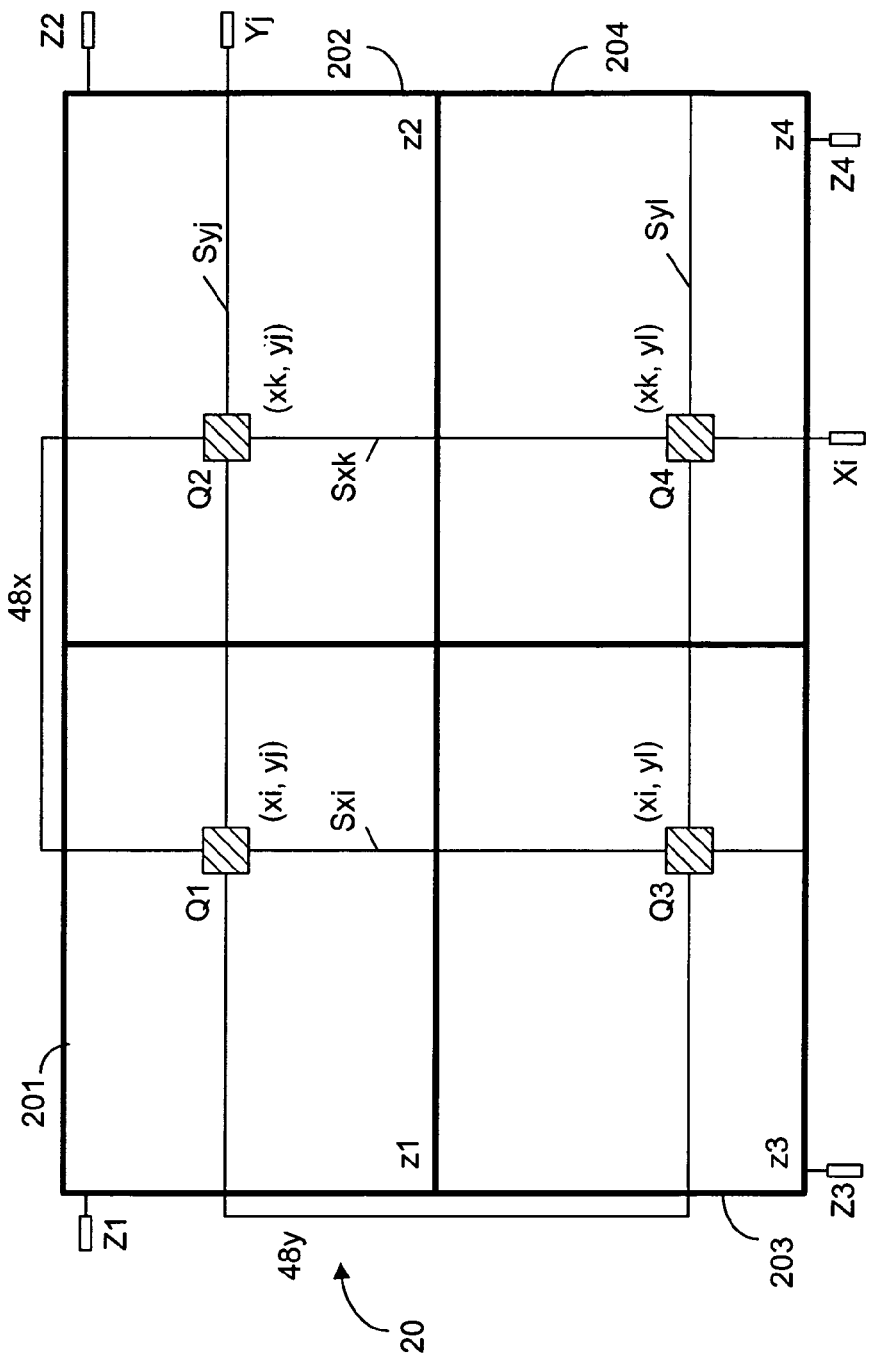
FIG. 5 shows a touch panel, according to another embodiment of the present invention.

If necessary, it is also possible to effectively reduce the number of y coordinates by two. As shown in FIG. 5, the touch sensing unit 20 is divided to comprise four zone sensing elements z1, z2, z3 and z4 and, separately, the zone sensing elements are electrically connected to zone terminals Z1, Z2, Z3 and Z4. The touch cells Q1, Q2, Q3 and Q4 are electrically connected by sensing elements Sxi, Sxk, Syj, Syl and via edge-bridge lines 48x, 48y to terminals Xi and Yj, so that the coordinates (xi, yj), (xk, yj), (xi, yl) and (xk, yl) can be determined via terminals Xi, Yj, Z1, Z2, Z3 and Z4.

Figure 6B:
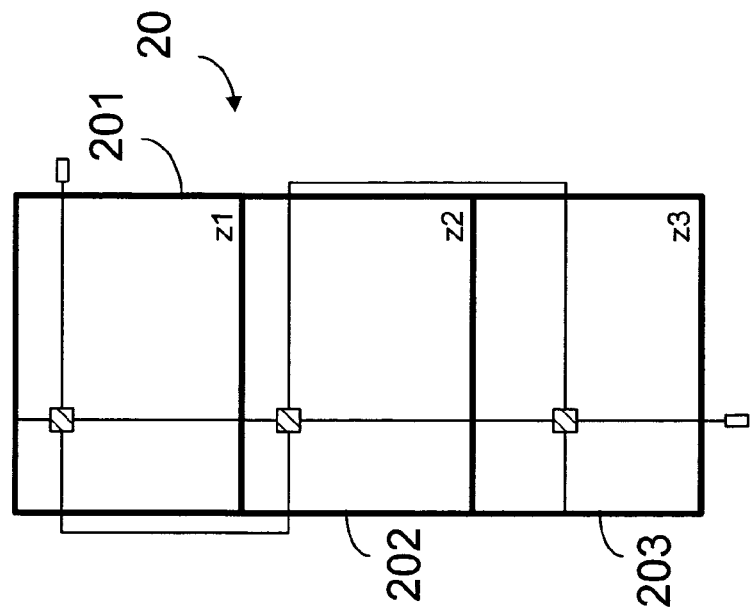
Figure 6A:
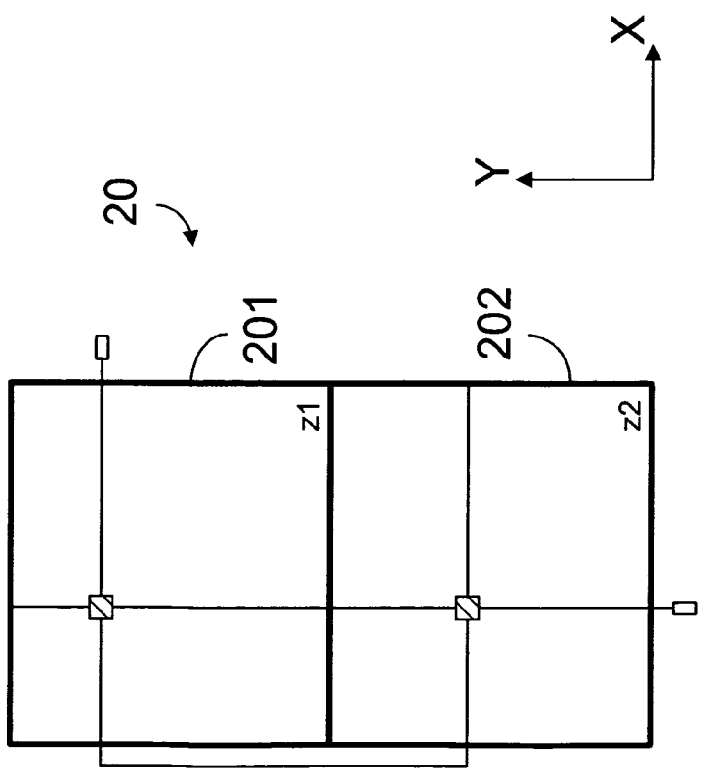

The partition of a touch sensing unit 20 into zones can be done differently, depending on the number of coordinates and the layout of the touch sensing unit. For example, a touch sensing unit can be partitioned into two zones as shown in FIG. 6a, a touch sensing unit can be partitioned into three zones as shown in FIGS. 6b and 6c, and a touch sensing unit can be partitioned into six zones as shown in FIG. 6d. In general, a touch sensing unit can be partitioned into L×K zones, where L and K are positive integers equal to or greater than 1.

Figure 7A:
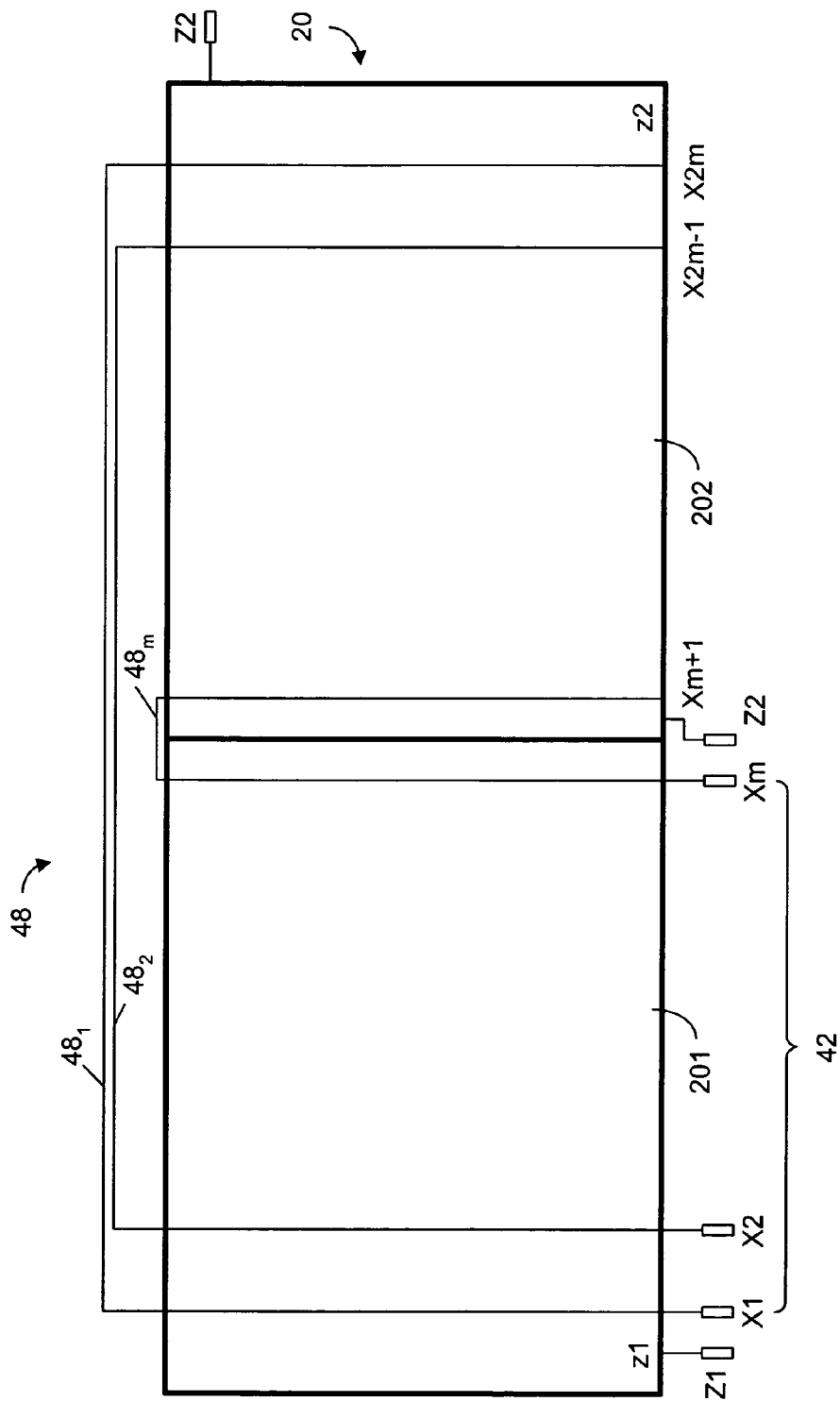
Figure 7B:
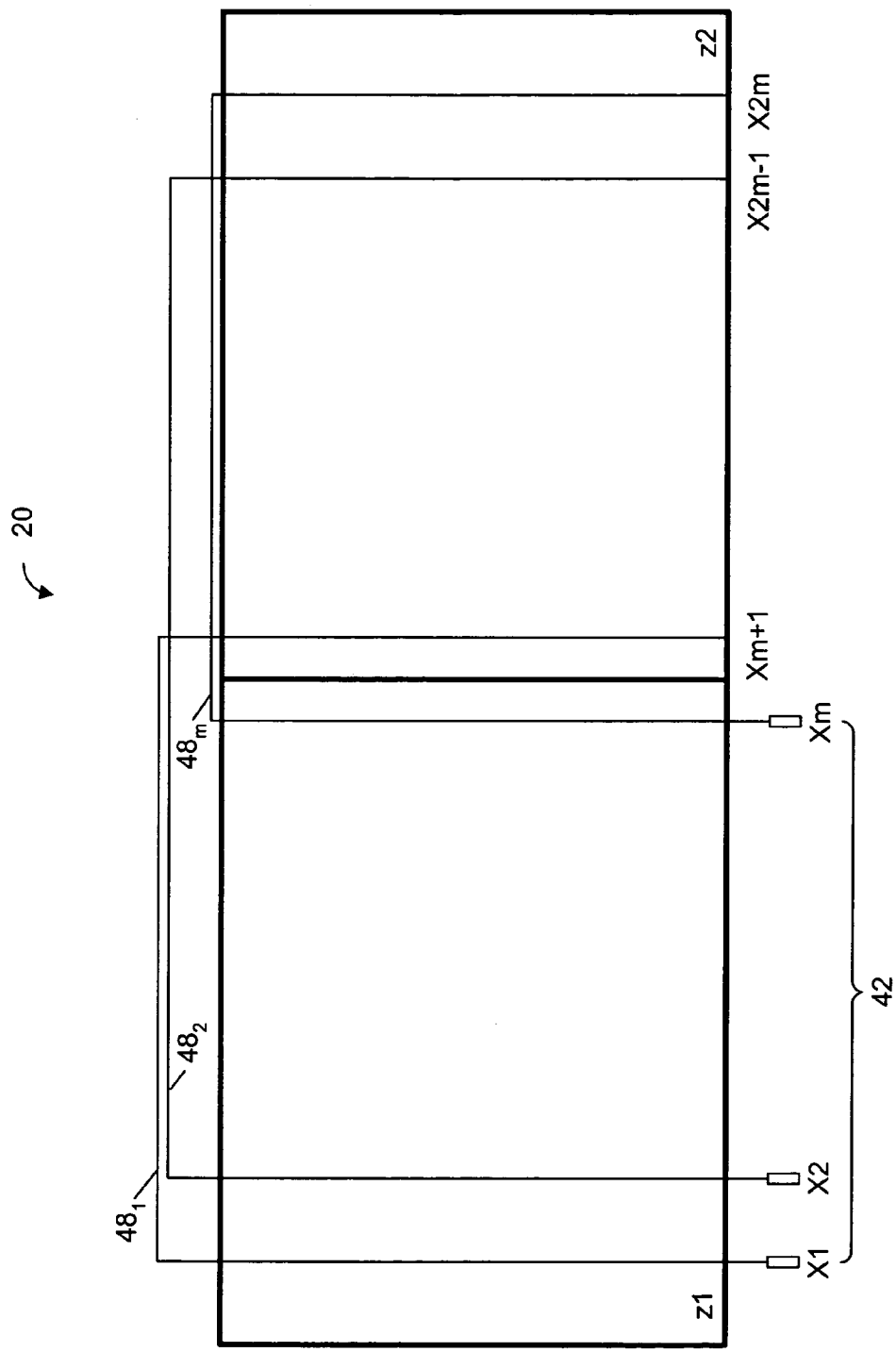
Figure 7D:
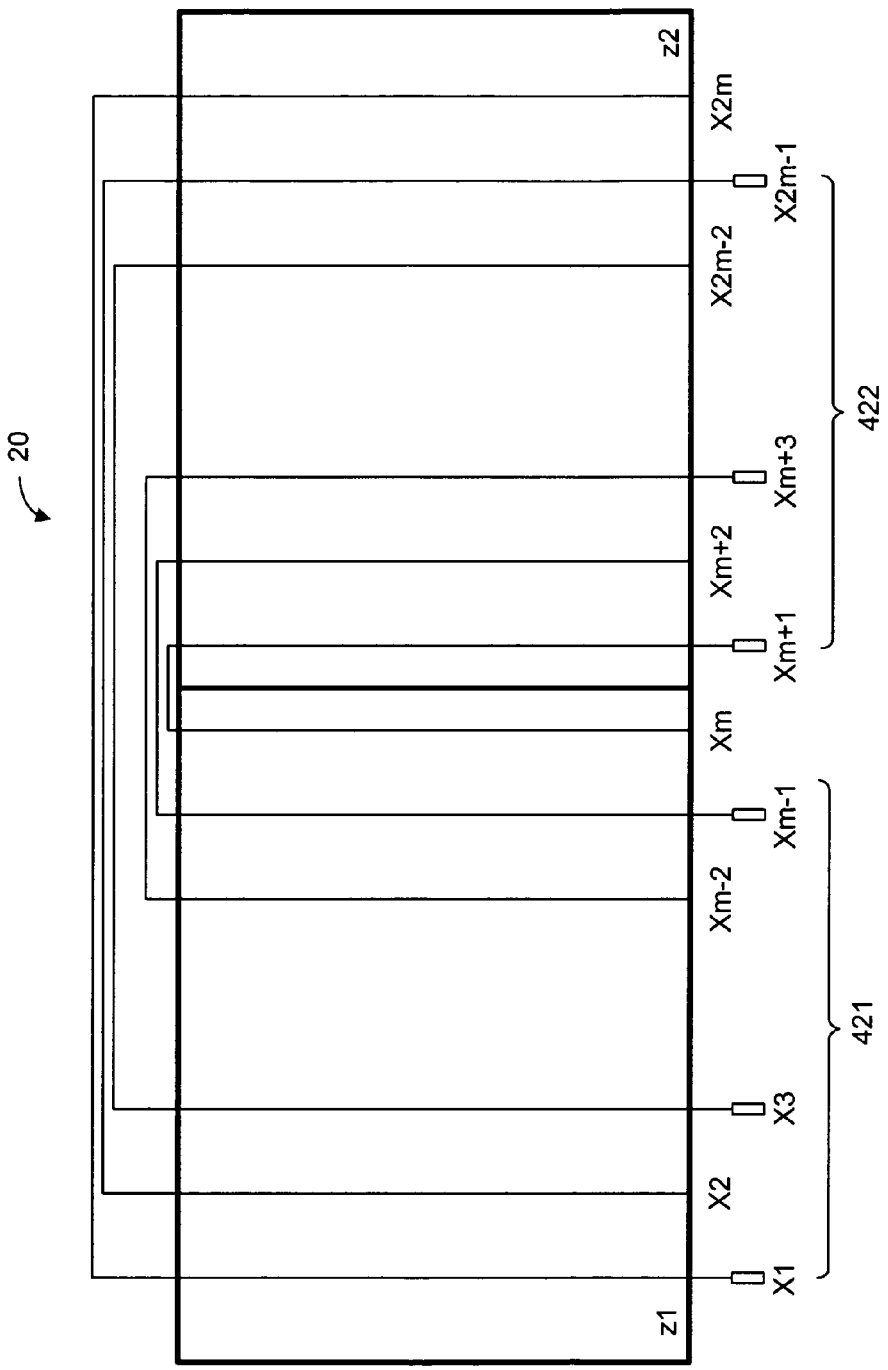

The inter-zone connections via edge-bridge lines can be carried out in many different ways. For example, all the x-coordinate connections to the readout terminals 42 are connected through one zone sensing element z1, as shown in FIGS. 7a and 7b. As shown in FIG. 7a, the touch cells with coordinate x1 and x2m are electrically connected to terminal X1 via edge-bridge line 48m, the touch cells with coordinate x2 and x2m−1 are electrically connected to terminal X2, ... via edge-bridge line 48₂, and the touch cells with coordinate xm and xm+1 are electrically connected to terminal Xm via edge-bridge line 48₁ in parallel (for coordinates, see FIG. 3). As such, there are no crossings among the edge-bridge lines or inter-zone conductors outside the touch sensing unit 20. As shown in FIG. 7b, the touch cells with coordinate x1 and xm+1 are electrically connected to terminal X1 via edge-bridge line 48₁, the touch cells with coordinate x2 and xm+2 are electrically connected to terminal X2, ... via edge-bridge line 48₂, and the touch cells with coordinate xm and x2m are electrically connected to terminal Xm via edge-bridge line 48m. There are many crossing points among the inter-zone conductors and insulation between two inter-zone conductors is required. In the embodiment as shown in FIG. 7c, the readout terminals X1, X2, ... are located outside zone sensing element z1, and the readout terminals Xm+1, Xm+2, are located outside zone sensing element z2 and there are no crossing points among the inter-zone conductors. In the embodiment as shown in FIG. 7d, the readout terminals are divided into two groups 421 and 422. The readout terminals X1, X3, ..., Xm−1 in group 421 are located outside z1, and the readout terminals Xm+1, Xm+3 and X2m−1 in group 422 are located outside z2, and there are no crossing points among the inter-zone conductors. As such, the readout terminals in each group can be spaced out.

If a touch sensing unit is partitioned into two zones along the y axis (see FIG. 6a), the inter-zone connections can be similar to those shown in FIGS. 7a-7d.

Figure 8:
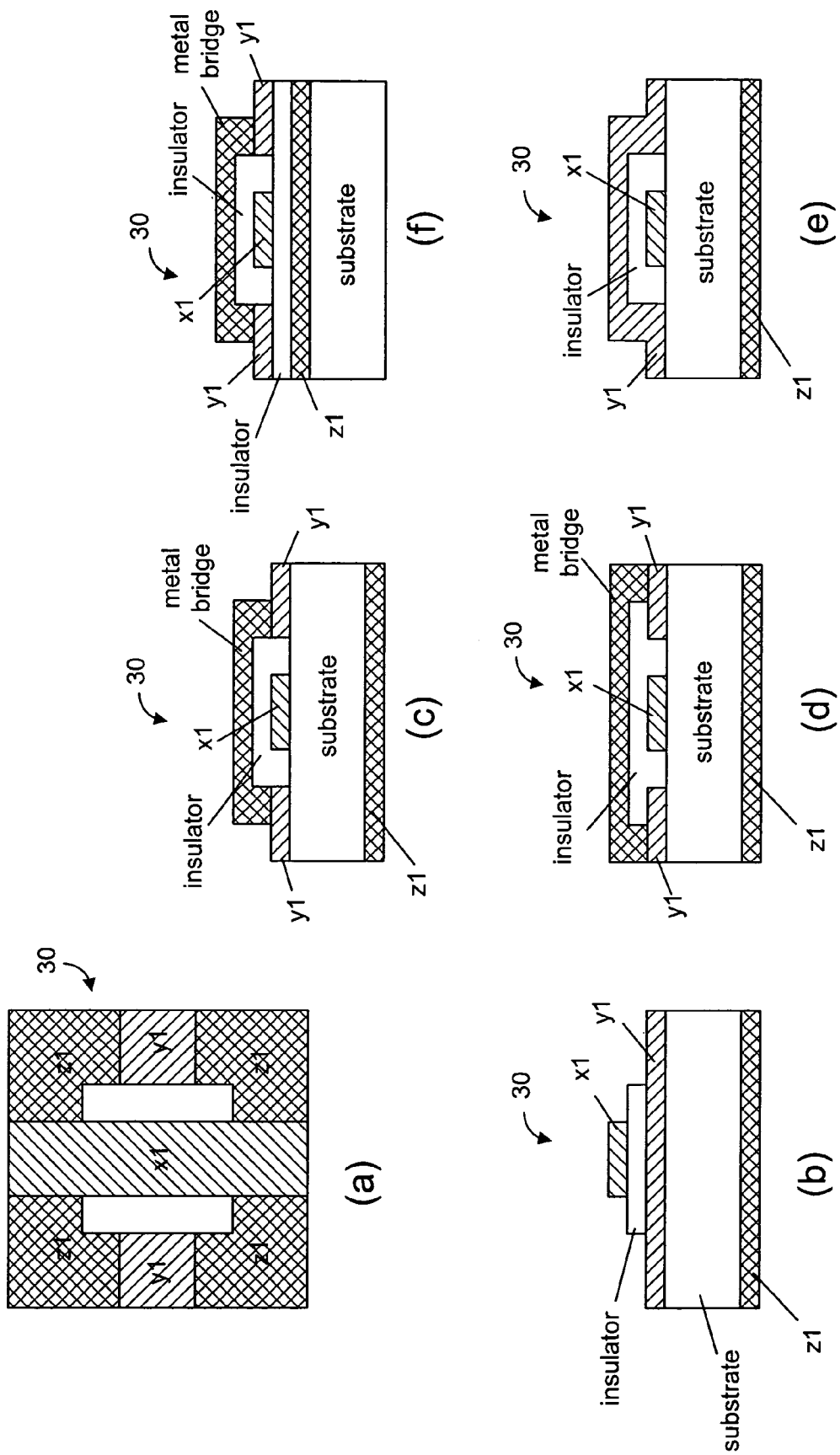
FIG. 8a shows an exemplary touch cell, according to one embodiment of the present invention.
FIGS. 8b-8f are cross sectional views showing different ways in implementing a touch cell, according to some embodiments of the present invention.

In various embodiments of the present invention, each touch cell or location is represented by three coordinates x, y and z. Each touch cell 30 is associated with three electrically separated conductive areas such that when a touch cell is touched, the changes in the capacitance can be sensed via an X terminal 42, a Y terminal 44 and a Z terminal 46 as shown in FIGS. 3 and 5. In a touch sensing unit where the touch cells 30 are shaped and arranged as shown in FIG. 4a, the conductive elements (i.e. the sensing elements) x1, y1, z1 in a touch cell 30 can be arranged as shown in FIG. 8a. The cross section of the touch cell 30 is shown in FIG. 8b. It is understood that, in inter-cell connections, the conductive element x1 in one touch cell is electrically connected to the conductive element x1 in an adjacent touch cell to form a readout line X1. Likewise, the conductive element y1 in one touch cell is electrically connected to the conductive element y1 in an adjacent touch cell to form a readout line Y1. Moreover, all the conductive elements zi in the same zone are connected to a readout terminal Zi.

As shown in FIG. 8b, the conductive elements y1 and z1 are located on different sides of a substrate, for example. The conductive elements x1 and y1 are separated by an insulating layer. In a different embodiment as shown in FIG. 8c, the conductive element x1 is covered by an insulator and the conductive element y1 comprises two electrically conducting sections on different sides of the insulator and connected by a metal bridge, for example. In the embodiment as shown in FIG. 8d, the insulator layer also covers part of the y1 conductive elements. The embodiment as shown in FIG. 8f is similar to that shown in FIG. 8c except that the conductive elements y1 and z1 are separated by an insulator layer, instead of the substrate. In an alternative embodiment, the conductive element z1 can be designed a wire-mesh located between the conductive elements x1 and y1. The conductive elements x1, y1 and z1 can be formed in one layer. In the embodiments as shown in FIGS. 8b-8f, the conductive elements y1 can be made of such as indium tin oxide (ITO), indium zinc oxide (IZO) or aluminum zinc oxide (AZO) and the conductive element x1 is part of a metal layer or ITO, for example. In the embodiment as shown in FIG. 8e, the entire conductive element y1 can also be made of ITO or metal.

In a touch sensing unit where the touch cells 30 are shaped and arranged as shown in FIG. 3b, the conductive elements in a touch cell 30 are arranged differently from those shown in FIG. 8a. However, the cross section of the touch cell can be similar to those shown in FIGS. 8b-8e.

Figure 4:
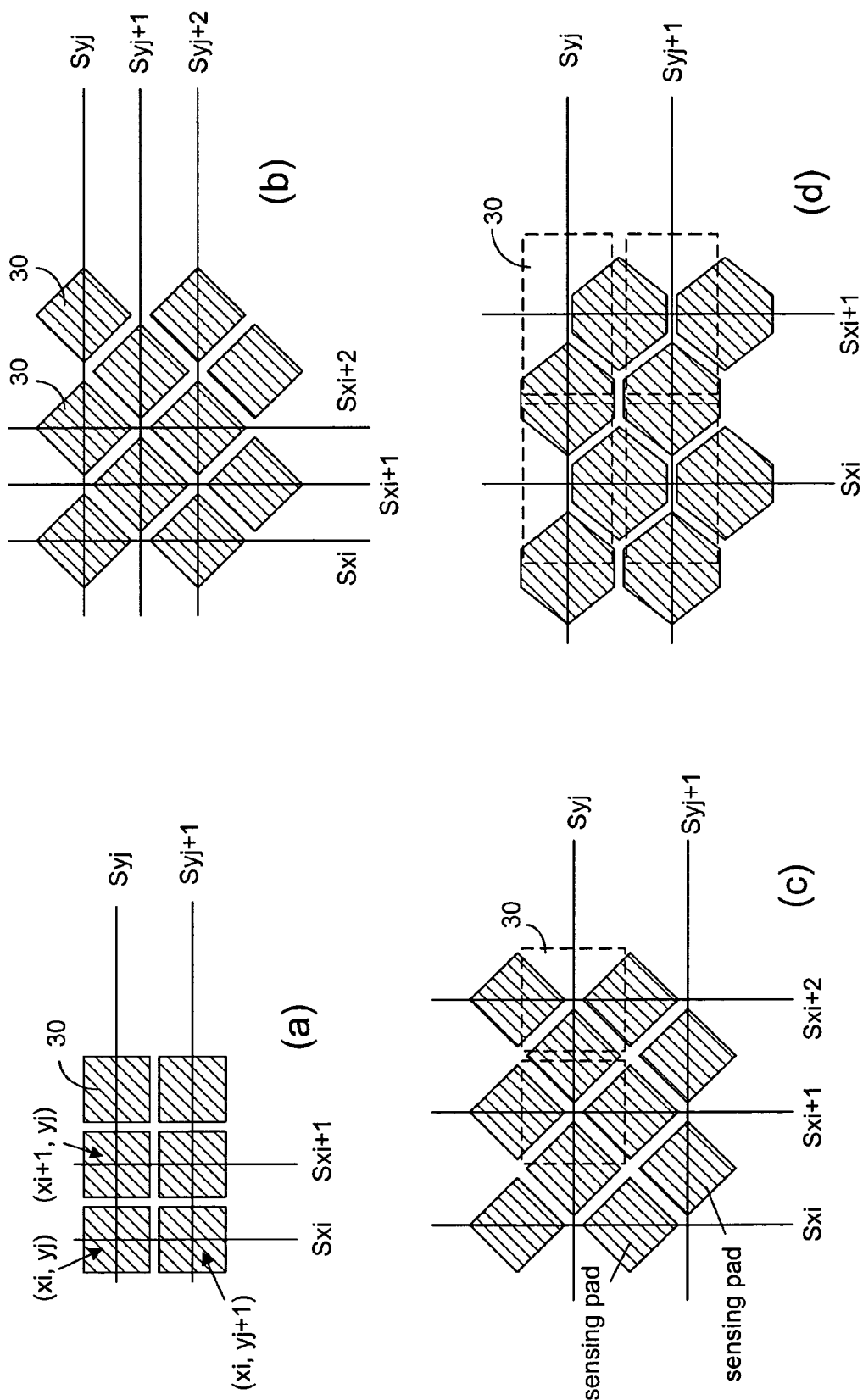
FIGS. 4a-4d show different arrangements of the touch cells on a touch panel.

In a touch sensing unit where the touch cells 30 are shaped and arranged as shown in FIGS. 3c and 4d, the layer structure as shown in FIGS. 8b-8e can be implemented at the crossing point between Yj and Xi, for example. The patches in the four sub-areas surrounding the crossing point can be made of ITO and/or thin wire-mesh so as to extend the areas to be touched in the touch sensing unit 20 (see FIGS. 4 and 5). The ITO and/or wire-mesh patches can increase the sensed capacitance of the associated touch cell. Because of the inter-zone connections, the resistance on a readout line connected to a channel may become too high to be driven by the IC. It is possible to thicken and/or widen at least part of the readout line in order to reduce the resistance. For example, the width and/or the thickness of the conductive elements x1, y1 can be increased. Similarly, the electrically conductive lines joining the corresponding conductive elements x1, y1 in adjacent touch cells can be thickened or widened.

Figure 9:
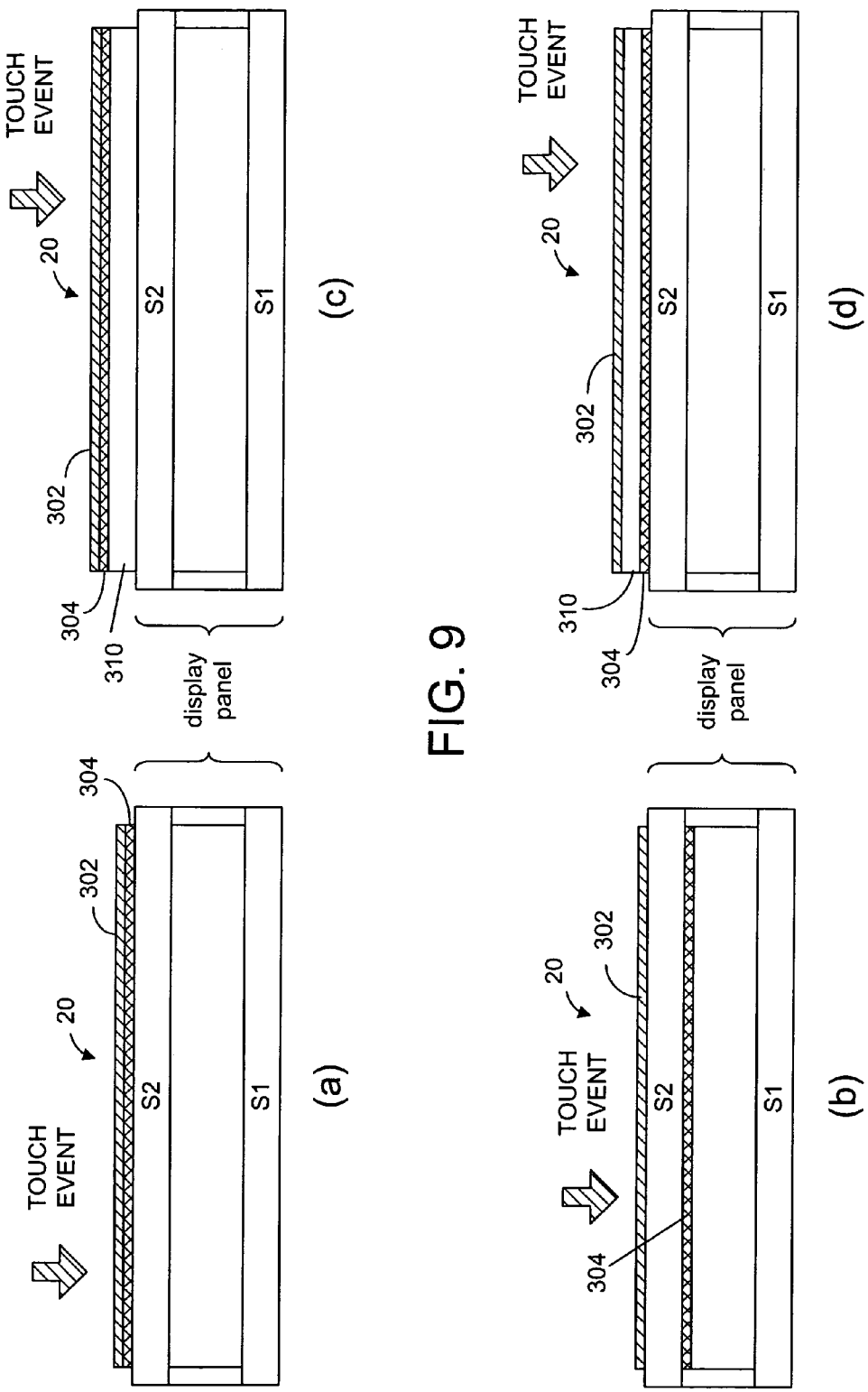
FIGS. 9a-9d show different ways in realizing a touch area on a display panel.

The touch sensing unit 20 or the touch panel 10 (see FIG. 1), according to various embodiments of the present invention, can be disposed on top of a display panel or integrated with a display panel. In a display panel comprising an upper substrate S2 and a lower substrate S1, with S2 facing a viewer, the touch panel 20 can be directly disposed on the upper substrate S2 as shown in FIGS. 9a and 9b. In FIG. 9a, the zone layer 304 for realizing the Z coordinates z1, z2, ... and the cell layer 302 for implementing the conductive elements x1, x2, ..., y1, y2, ... can be disposed on the upper substrate S2. In another embodiment of the present invention, the cell layer 302 is disposed on top of the upper substrate S2, whereas the zone layer 304 is disposed on the other side of the upper substrate S2, as shown in FIG. 9b. In different embodiments of the present invention, the touch panel is fabricated on a separate or auxiliary substrate 310, as shown in FIGS. 9c and 9d. In the embodiment as shown in FIG. 9c, both the cell layer 302 and the zone layer 304 are disposed on top of the substrate 310. In the embodiment as shown in FIG. 9d, the cell layer 302 is disposed on top of the substrate 310, whereas the zone layer 304 is disposed on the bottom side of the substrate 310. It is also possible that the zone layer 304 is directly disposed on top of the substrate S2 of the display panel. The substrate 310 can be made of an optically transparent material such as glass or polymer. In a modified embodiment, the substrate 310 also may be rigid a printed circuit board or a flexible printed circuit board for other requirements.

Figure 10:
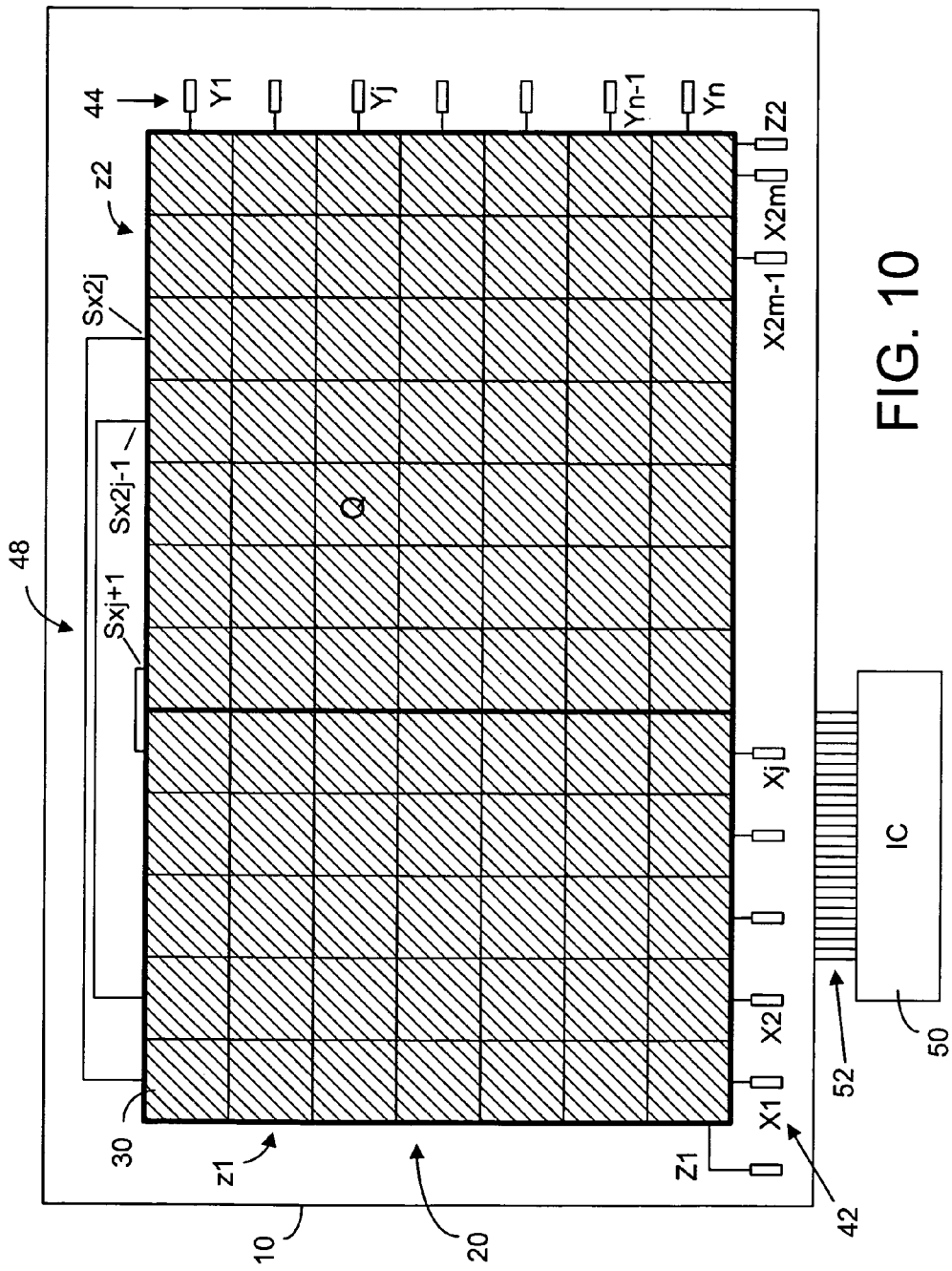
FIG. 10 shows another embodiment of the present invention.

It should be noted that the present invention provides a method for use in a capacitive touch panel wherein the touch sensing unit of the touch panel is partitioned into a plurality of zones in order to reduce the number of ICs, depending on the number of channels in the ICs and the total number of x-coordinates and y coordinates of the touch cells 30. In some cases, it is sufficient to connect some of readout lines in one zone to the corresponding readout lines in another zone. For example, in a touch panel as shown in FIG. 10, only the readout lines $Xj+1, \ldots, X2j-1, X2j$ in zone z2 are connected to terminals $X1, X2, \ldots, Xj$. via the corresponding readout lines in zone z1. The readout lines connected to terminals $X2m-1, X2m$ in zone z2 are not connected to z1, so long as the total number of readout terminals $Z1, Z2, X1, X2, \ldots, Xj, X2m-1, X2m$ does not exceed the number channels in the IC 50.

In sum, the present invention is concerned with a capacitive touch panel that uses a substrate as a base for a touch sensing unit. The substrate can be arranged into a plurality of touch zones, and the touch sensing unit includes a plurality of first sensing elements and a plurality of second sensing elements disposed in the touch zones for touch sensing. The first sensing elements are arranged in a first direction for defining first coordinates, and the second sensing elements are arranged in a second direction for defining second coordinates. The touch sensing unit further includes a plurality of zone sensing elements in the touch zones for defining zone coordinates. Each of the first sensing elements includes a plurality of first sensing pads connected in series and each of the second sensing elements includes a plurality of second sensing pads connected in series. Each of the first sensing elements crosses one of the second sensing elements at a crossing point and a touch cell is formed at the crossing point.

The capacitive touch panel further includes means for electrically connecting at least some of the first sensing elements in one of the touch zones to corresponding ones of the first sensing elements in at least another of the touch zones in series. For example, the electrical connections between the first sensing elements in one of the touch zones and the corresponding first sensing elements in other the touch zones in series are provided by the first edge-bridge lines. The edge-bridge lines can be arranged in parallel, or in a crossed manner. In order to monitor an touch event on the touch sensing unit, the touch panel further includes a plurality of first terminals electrically connected to at least some of the first sensing elements; a plurality of second terminals electrically connected to at least some of the second sensing elements; and a plurality of third terminals electrically connected to the zone sensing elements. These terminals are connected to a driving integrated circuit for driving.

In some embodiments, the substrate has a first side and an opposing second side, and wherein the first sensing elements and the second sensing elements are disposed on the first side, and the zone sensing elements are disposed on one of the first side and the second side. The substrate can be a display panel. In other embodiments, the touch panel has an auxiliary substrate disposed between the touch sensing device and the display panel.

The substrate can be a printed circuit board. It can transparent. It can be rigid or flexible.

The present invention also provides a method for used a capacitive touch panel which comprises a substrate as a base for a touch sensing unit. The touch sensing unit includes a plurality of first sensing elements, each first sensing element arranged in a first direction for defining a first coordinate; a plurality of second sensing elements, each second sensing element arranged in a second direction for defining a second coordinate. The method comprises: arranging the substrate into a first touch zone and a second touch zone; arranging the plurality of first sensing elements into a first group of first sensing elements and a second group of first sensing elements, the first group located in the first touch zone and the second ground located in the second touch zone; electrically connecting at least some of the first sensing elements in the first group to corresponding ones of the first sensing elements in the second group in series; and providing a first zone sensing element in the first touch zone for defining a first zone coordinate and a second zone sensing element in the second touch zone for defining a second zone coordinate. The method further comprises electrically connecting said some of the first sensing elements to a plurality of first sensing terminals; electrically connecting at least some of the second sensing elements to a plurality of second sensing terminals; electrically connecting the first zone sensing element and the second zone sensing element to a first zone terminal and the second zone terminal; and providing a driving circuit for driving the first sensing terminals, the second sensing terminals, the first zone terminal and the second zone terminal.

Figure 11:
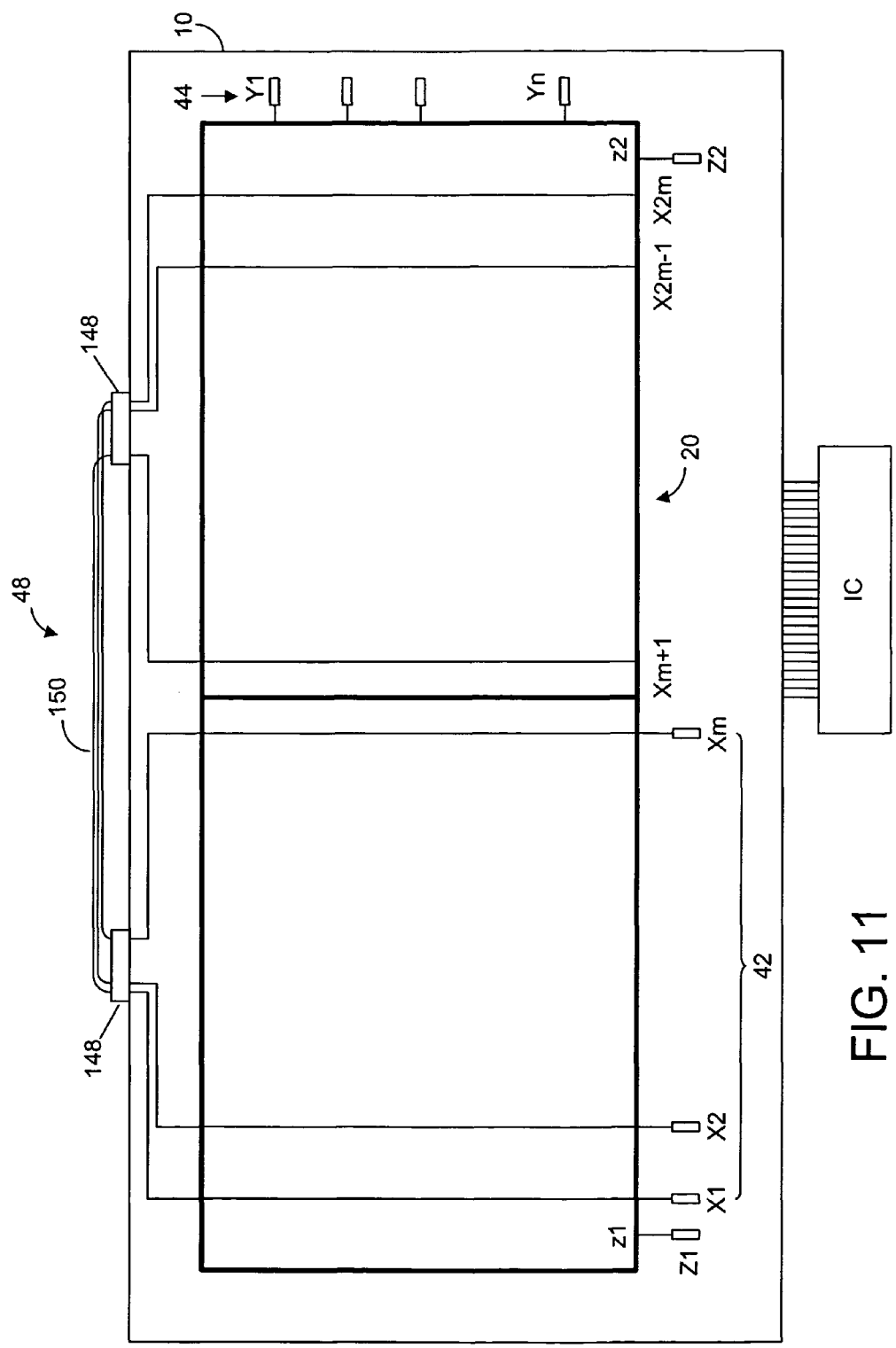
FIG. 11 shows a different embodiment of the present invention.

It should be noted that the inter-zone connection can be realized by electrical conductors disposed on a substrate in the touch panel 10 (FIG. 10; S2 in FIGS. 9a, 9b; 310 in FIGS. 9c, 9d, for example). The inter-zone connections can also be realized by using connectors 148 with one or more ribbon cables, flexible printed circuit 150, or the like, as shown in FIG. 11.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A capacitive touch panel, comprising:
    a substrate comprising a plurality of touch zones arranged in an array in a non-overlapping manner; and
    a touch sensing unit disposed on the substrate, the touch sensing unit comprising:
        a plurality of first sensing elements disposed in the touch zones, each first sensing element arranged in a first direction for defining a first coordinate;
        a plurality of second sensing elements disposed in the touch zones, each second sensing element arranged in a different second direction for defining a second coordinate, the first sensing elements arranged to cross the second sensing elements for forming a plurality of touch cells;
        a plurality of zone sensing elements, each zone sensing element disposed in a different one of the touch zones for defining a zone coordinate, each zone sensing element arranged to overlap substantially with a group of touch cells, wherein the zone sensing elements are different from and not directly electrically connected to the first sensing elements and the second sensing elements;
        a plurality of first terminals electrically connected to at least some of the first sensing elements;
        a plurality of second terminals electrically connected to at least some of the second sensing elements;
        a plurality of third terminals electrically connected to the zone sensing elements and
        a plurality of first edge-bridge lines at an edge of the touch zones, each of the touch zones comprising a plurality of first sensing elements for defining a plurality of first coordinates and a plurality of second sensing elements for defining a plurality of second coordinates, wherein each of the first edge-bridge lines is arranged to separately connect some of the first sensing elements in series in at least one of the touch zones and corresponding some of the first sensing elements in series in at least another one of the touch zones.

2. The capacitive touch panel according to claim 1, wherein each of the first edge-bridge lines electrically connected to one of the first terminals correspondingly.

3. The capacitive touch panel according to claim herein the first edge-bridge lines are arranged in parallel.

4. The capacitive touch panel according to claim 1, wherein some of the first edge-bridge lines are arranged in a crossed manner.

5. The capacitive touch panel according to claim 1, wherein the plurality of touch zones comprise a first touch zone and a second touch zone, and the plurality of first sensing elements comprise a first group of first sensing elements located in the first touch zone and a second group of first sensing elements located in the second touch zone, said touch panel further comprising:
    a plurality of first edge-bridge lines for separately connecting at least some of the first sensing elements in the first group to the corresponding first sensing elements in the second group in series.

6. The capacitive touch panel according to claim 1, wherein the plurality of touch zones comprise a first touch zone, a second touch zone, a third touch zone and a fourth touch zone arranged in a two dimensional array, and wherein
    the plurality of first sensing elements comprise a first group of first sensing elements and a second group of first sensing elements, the first group of first sensing elements located in the first touch zone and the third touch zone, the second group of first sensing elements located in the second touch zone and the fourth touch zone, and
    the plurality of second sensing elements comprise a first group of second sensing elements and a second group of second sensing elements, the first group of second sensing elements located in the first touch zone and the second touch zone, the second group of second sensing elements located in the third touch zone and the fourth touch zone, said touch panel further comprising:
    a plurality of first edge-bridge lines for separately connecting at least some of first sensing elements in the first group of the first sensing elements to the corresponding first sensing elements in the second group of the first sensing elements in series; and a plurality of second edge-bridge lines for separately connecting at least some of second sensing elements in the first group of the second sensing elements to the corresponding second sensing elements in the second group of the second sensing elements in series.

7. The capacitive touch panel according to claim 1, further comprising a driving integrated circuit electrically connected to the first terminals, the second terminals and the third terminals for driving the first sensing elements, the second sensing elements and the zone sensing elements.

8. The capacitive touch panel according to claim 1, wherein the substrate has a first side and an opposing second side, and wherein the first sensing elements and the second sensing elements are disposed on the first side, and the zone sensing elements are disposed on one of the first side and the second side.

9. The capacitive touch panel according to claim 1, wherein the substrate comprising a display panel.

10. The capacitive touch panel according to claim 9, further comprising an auxiliary substrate disposed between the touch sensing unit and the display panel.

11. The capacitive touch panel according to claim 1, wherein the substrate comprising a transparent substrate.

12. The capacitive touch panel according to claim 1, wherein the substrate comprising a printed circuit board.

13. The capacitive touch panel according to claim 1, wherein each of the first sensing elements comprises a plurality of first sensing pads connected in series and each of the second sensing elements comprises a plurality of second sensing pads connected in series.

14. The capacitive touch panel according to claim 1, wherein each of the first sensing elements crosses one of the second sensing element at a crossing point, forming one of the touch cells.

15. The capacitive touch panel according to claim 1, wherein each of the zone sensing elements is spaced from the touch cells.

16. A touch sensing unit adapted for a capacitive touch panel having a substrate comprising a plurality of touch zones arranged in array in an non-overlapping manner, the touch sensing unit comprising:

a plurality of first sensing elements disposed in the touch zones, each of the first sensing elements arranged in a first direction for defining a first coordinate;

a plurality of second sensing elements disposed in the touch zones, each of the second sensing elements arranged in a second direction different from the first direction for defining a second coordinate, the second sensing elements arranged to cross the first sensing elements to form a plurality of touch cells;

a plurality of zone sensing elements, each of the zone sensing elements disposed in one of touch zones correspondingly and differently for defining a zone coordinate, each of the zone sensing elements arranged to overlap substantially with a group of the touch cells, wherein the zone sensing elements are electrically isolated from the first sensing elements and the second sensing elements;

a plurality of first terminals electrically connected to at least some of the first sensing elements;

a plurality of second terminals electrically connected to at least some of the second sensing elements;

a plurality of third terminals electrically connected to the zone sensing elements correspondingly; and a plurality of first edge-bridge lines at an edge of the touch zones, each of the touch zones comprising a plurality of first sensing elements for defining a plurality of first coordinates and a plurality of second sensing elements for defining a plurality of second coordinates, wherein each of the first edge-bridge lines is arranged to separately connect some of the first sensing elements in series in at least one of the touch zones and corresponding some of the first sensing elements in series in at least another one of the touch zones.

17. A capacitive touch unit, comprising:

a plurality of touch zones;

a plurality of coordinate sensing elements disposed in the touch zones in a substrate, each coordinate sensing element identifiable by a first coordinate and a different second coordinate, wherein, among the plurality of coordinate sensing elements, at least one coordinate sensing element in one of the touch zones is electrically connected to one corresponding coordinate sensing element in at least another one of the touch zones, and wherein the first coordinate of said one coordinate sensing element is the same as the first coordinate of said corresponding coordinate sensing element but the second coordinate of said one coordinate sensing element is different from the second coordinate of said corresponding coordinate sensing element; and a plurality of zone sensing elements different from the coordinate sensing elements, the zone sensing elements disposed on the substrate and identifiable by a plurality of zone coordinates in different touch zones, each zone sensing element associated with and spaced from a different one of the coordinate sensing elements, wherein only one of the second coordinate of said coordinate sensing element and the second coordinate of said corresponding coordinate sensing element is arranged for determining the second coordinate of said coordinate sensing element and the second coordinate of said corresponding coordinate sensing element based on the zone coordinates.

18. The capacitive touch unit according to claim 17, further comprising a plurality of first electrical conductors, a plurality of second electrical conductors and a plurality of electrically conductive elements on a substrate, each of the electrically conductive elements associated with a different one of the coordinate sensing elements, and wherein each of the coordinate sensing elements comprises a first sub-element for defining the first coordinate and a second sub-element for defining the second coordinate, such that the first sub-elements of the same first coordinate are electrically connected to one another via a different one of the first electrical conductors, and the second sub-elements of the same second coordinate are electrically connected to one another via a different one of the second electrical conductors, and wherein the electrically conductive element in the same touch zone are electrically connected to a zone terminal for determining the zone coordinate of said same touch zone.

19. The capacitive touch panel according to claim 1, wherein said plurality of touch zones comprise at least a first touch zone and a second touch zone, and each of said plurality of the first edge-bridge lines is arranged to connect some of the first sensing elements in the first touch zone in series and corresponding some of the first sensing elements in the second touch zone in series.

* * * * *